Nov. 9, 1937.  J. A. LAW  2,098,395
PROCESS OF AND APPARATUS FOR MOLDING HOLLOW RUBBER ARTICLES
Filed Aug. 16, 1934  2 Sheets-Sheet 1

James Allan Law
INVENTOR

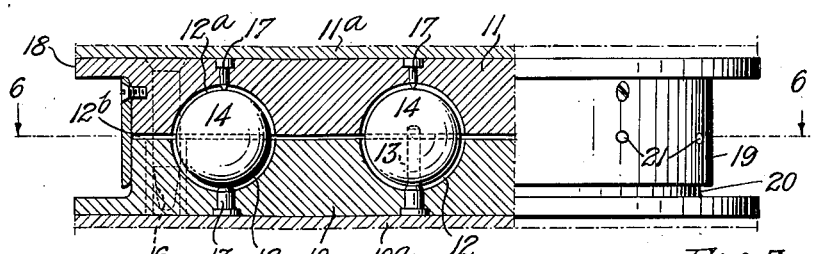
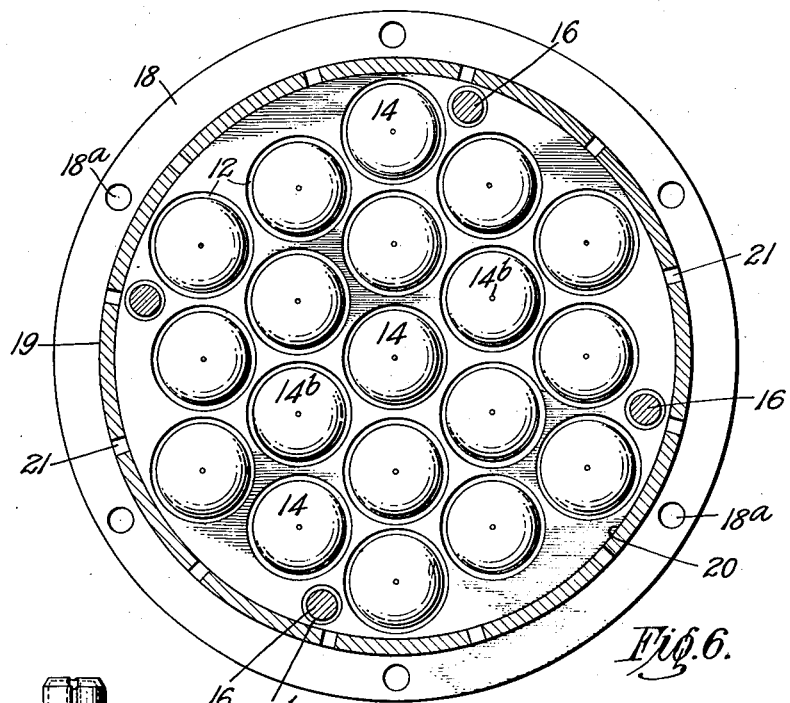
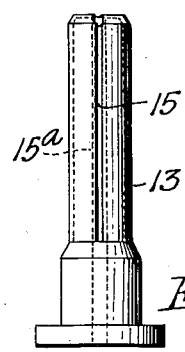
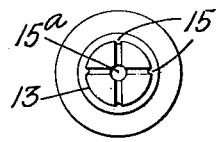
James Allan Law
INVENTOR

Patented Nov. 9, 1937

2,098,395

UNITED STATES PATENT OFFICE 2,098,395

PROCESS OF AND APPARATUS FOR MOLDING HOLLOW RUBBER ARTICLES

James Allan Law, Kensington, Victoria, Australia

Application August 16, 1934, Serial No. 740,128
In Australia August 24, 1933

4 Claims. (Cl. 18—42)

This invention relates to improvements in the process of and means for molding hollow rubber balls described in United States of America Letters Patent No. 1,877,673 dated 13th September, 1932.

The object of this invention is to improve the said process and apparatus to ensure that spherical shells of uniform high quality for use in the manufacture of tennis and like balls will be produced rapidly and efficiently.

This invention is characterized in that sufficient plastic rubber to form an article to be molded is placed on a removable core, is trapped in the mold cavity and is then subjected to pressure until every part of such cavity is tightly packed with rubber, thus ensuring the production of shells which conform exactly to the form of the cavity and each of which has walls of the predetermined thickness without air bubbles or other defects.

This invention is further characterized in that apparatus for carrying the said process into effect includes a mold part having a wall or flange which engages a face on another mold part trapping the plastic rubber and holding it until it is subjected to sufficient pressure to ensure that all parts of the mold cavity are tightly packed, and in that spaced apart apertures in the said wall are so located that the desired pressure is exerted on the rubber in the mold before excess rubber escapes through them.

But in order that this invention may be more readily understood it will now be described with reference to the accompanying drawings:—

In the drawings Figs. 1 to 4 are central vertical sections of co-operating mold members illustrating the steps of manufacture according to this process.

Fig. 5 is a view of a multi-cavity mold partly in central vertical section and partly in elevation.

Fig. 6 is a sectional plan on line 6—6 of Fig. 5.

Fig. 8 is a detail side view of a core support.

Fig. 9 is a plan of the core support shown in Fig. 8.

Figure 1:
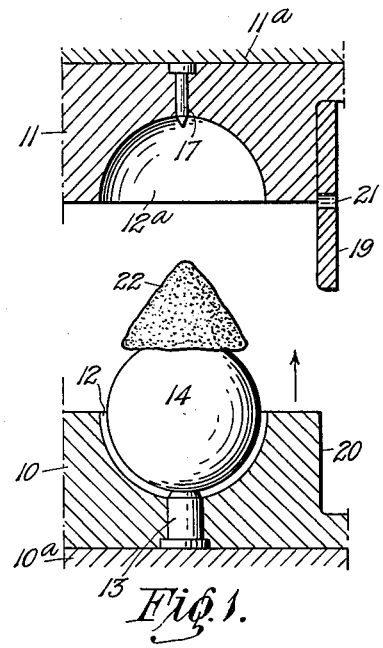
Fig. 1 shows parts of a mold with a core located in the lower part and with a quantity of plastic rubber on the top of the core.

10—11 are mold members which are so supported that they may be moved toward and from each other as desired. Thus either or both said members may be movable, and by way of example the drawings illustrate a mold in which the lower member 10 is movable relatively to a fixed upper member 11. Mold member 10 contains any suitable number of hemispherical cavities 12 each of which is arranged to co-operate with a hemi-spherical cavity 12ª in mold member 11, so that when the parts are closed together spherical cavities are formed.

There is a small clearance 12ᵇ between the adjacent faces of the mold members 10—11 when the mold is closed, to permit rubber to flow and to allow surplus rubber to escape as hereinafter described. Such clearance is for example, five one-thousandths of an inch in depth and the resultant fin on the molded article is so thin that it is readily removable.

A peg 13 projects into each mold cavity 12 to engage a socket 14ª in a removable core 14 in such manner that when the mold is closed, the core is centralized within the spherical cavity. Each said peg has grooves 15 on its exterior leading to an air escape passage 15ª through the peg 13.

To ensure accurate register, one mold member carries tapered guide pins 16 which enter registering sockets 16ª and said sockets are preferably provided with removable sleeves 16ᵇ.

When each formed shell is to have a small hole in addition to the hole formed by peg 13, a projection 17 enters each mold cavity 12ª sufficiently to engage a small hole 14ᵇ in the top of the core, thus ensuring that the core will be centralized during molding.

Preferably each peg 13, pin 16 and projection 17 is fitted in a socket in a mold member, and each has a head which is retained by an adjacent structure as 10ª—11ª so that the said members are firmly held in position but are readily accessible and removable for repair or replacement.

Structures 10ª, 11ª have passages (not shown) for circulation of steam whereby the mold members may be uniformly heated.

Each mold member has a plurality of cavities arranged as closely together as convenient (see Fig. 6) and the mold members are so supported that the co-operating mold cavities are in register. In one case each mold part has a flange 18 in which are holes as 18ª to receive bolts or the like whereby they are secured to structures 10a, 11a respectively.

One mold member (11 for example) carries a peripheral wall or flange 19 which is adapted to closely engage a face 20 on mold member 10 before the plastic rubber can escape.

Wall 19 is apertured at 21 to permit the escape of surplus rubber from between the mold faces, and such apertures, are so located that they register with clearance 12b between adjacent mold faces but their position and area is such that rubber cannot escape before it is subjected to sufficient pressure to completely fill all mold cavities.

It will be understood that there may be a wall concentrically around each cavity of one member of the mold, said wall being adapted to enter a complementary groove which is concentric with the registering cavity in the other mold member but it is preferable to encompass a plurality of cavities with a circular wall as described and illustrated.

Figure 2:
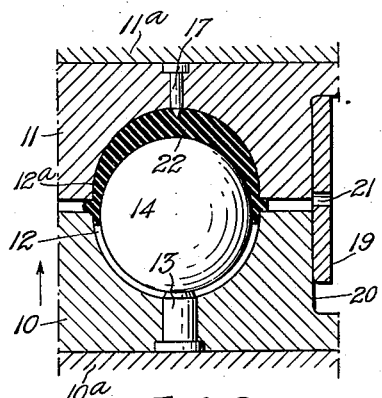
Fig. 2 shows the mold members nearer to each other and with the rubber partly distributed, the space between mold members being sealed by a wall.
Figure 3:
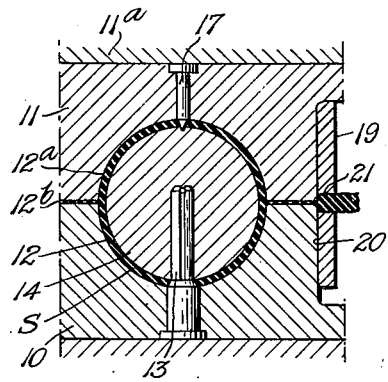
Fig. 3 shows the mold members closed together and with the core surrounded by a formed shell.
Figure 4:
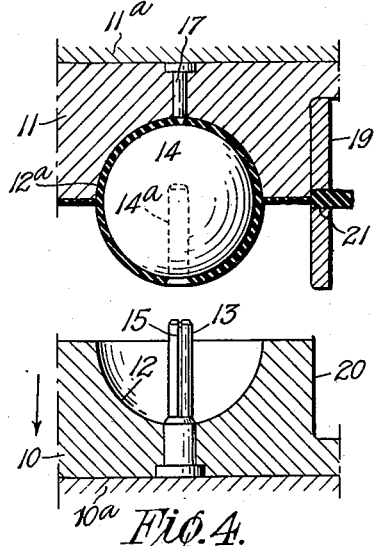
Fig. 4 shows the mold again opened for removal of the core surrounded by the formed shell.
Figure 7:
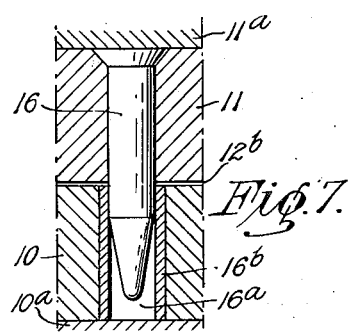
Fig. 7 is a detail view of a mold guide.

In carrying the invention into operation the cavities of the lower mold member 10 are first painted with a suitable known solution to prevent adhesion of rubber thereto. Cores 14 are then located and a wad 22 of plastic rubber having a broad base and a pointed top is placed on each core. The controls are then operated to close the mold and as mold members approach each other the rubber is distributed (see Fig. 2) but before the flowing rubber can escape through the clearance 12b it is trapped by the wall 19 engaging the face 20. Rubber will then be forced into each cavity under pressure after which any surplus will escape through apertures 21 as before described. As the rubber enters the lower part of the mold cavities air escapes through grooves 15 and passage 15a and between members 10, 10a so that no obstruction is offered to complete filling of each cavity. The molded shells as S are then subjected to heat until they are partly cured after which the mold parts are separated, the molded shells in the cores adhering to the upper mold part so that a tool can be inserted in the core socket 14a to remove them for further treatment in known manner. After the rubber shells each containing a core 14 have been removed from the mold, each shell is stripped from the core by forcing the latter through the hole formed in the shell owing to the presence of peg 13. In my prior Patent 1,877,673, I have described the manner in which cores and the ball are separated, viz: Any suitable separating means may be employed: I find that a hook if engaged with the ball hole enlarges it sufficiently.

I claim:—

1. Mold devices for plastic rubber comprising two co-operating parts having spaced apart cavities in registry, means to support a core centrally in each cavity of one of the mold parts, a wall on one mold part entirely surrounding the area of the mold and projecting beyond the said mold part to close the space between the said mold parts while they are in spaced apart position and apertures in said wall, and means in the other mold part to engage the cores to cause the adjacent faces of the mold parts to be spaced apart a short distance when the molds are closed to their most adjacent position and when the mold parts are in such position the apertures in the wall register with the space between the said parts.

2. A mold, according to claim 1, in which one mold part is fixed and the other movable relatively thereto, the cores being arranged in the cavities in the fixed mold part and the apertured wall being a rim which projects from the movable mold part to encircle the fixed mold and slidably engage its peripheral face.

3. A mold, according to claim 1, in which the spacing apart of the apertures causes the plastic rubber to be subjected to sufficient pressure to force it into all parts of the mold cavities before the excess rubber escapes through the said apertures.

4. A mold for plastic rubber comprising upper and lower mold members each having a plurality of spaced apart hemispherical mold cavities in registry, means to support a spherical core centrally of each cavity of the lower mold member, a rim carried by the upper mold member arranged to encircle the lower member and slidably engage its peripheral face, spaced apart apertures in said rim, and means in the upper mold cavities to engage the cores and to cause the adjacent faces of the mold members to be spaced apart a short distance when in their most adjacent position and the apertures in the rim to be so arranged that they register with the said space between the mold members when they are in said adjacent position.

JAMES ALLAN LAW.